United States Patent [19]
Ito

[11] Patent Number: 4,530,514
[45] Date of Patent: Jul. 23, 1985

[54] TOE-OUT CHANGE PREVENTIVE SWING-ARM VEHICLE SUSPENSION

[75] Inventor: Hideo Ito, Zushi, Japan

[73] Assignee: Nissan Motor Company, Limited, Yokohama, Japan

[21] Appl. No.: 485,022

[22] Filed: Apr. 14, 1983

[30] Foreign Application Priority Data

Apr. 26, 1982 [JP] Japan .................................. 57-69763

[51] Int. Cl.³ ............................ B60G 3/26; B60G 7/02
[52] U.S. Cl. ..................................... 280/701; 267/57; 267/57.1 A; 280/690
[58] Field of Search ............... 280/701, 675, 674, 673, 280/690, 688; 267/57, 57.1 A

[56] References Cited

U.S. PATENT DOCUMENTS

| 3,189,118 | 6/1965 | Arning ............................. 280/701 X |
| 3,520,554 | 7/1970 | Ravenel ............................. 280/688 |
| 4,245,853 | 1/1981 | Inoue et al. ......................... 280/701 |
| 4,257,623 | 3/1981 | Kawase et al. ................. 280/701 X |
| 4,280,717 | 7/1981 | Hanai et al. ......................... 280/663 |

FOREIGN PATENT DOCUMENTS

| 0070025 | 1/1983 | European Pat. Off. . |
| 0071250 | 2/1983 | European Pat. Off. . |
| 2729962 | 1/1979 | Fed. Rep. of Germany . |
| 39909 | 4/1981 | Japan .................................. 280/688 |
| 1002077 | 8/1965 | United Kingdom . |
| 2036241 | 6/1980 | United Kingdom . |

OTHER PUBLICATIONS

European Search Report.

Primary Examiner—Joseph F. Peters, Jr.
Assistant Examiner—Mitchell J. Hill
Attorney, Agent, or Firm—Schwartz, Jeffery, Schwaab, Mack, Blumenthal & Evans

[57] ABSTRACT

A swing-arm type suspension having a suspension arm for suspending a road wheel on a vehicle body. A lateral link is also provided for restricting yawing movement of the suspension arm and thereby for restricting toe-angle change. The suspension arm is connected to the vehicle body by bifurcated legs via elastic bushings. The suspension arm is adapted to roll in response to rolling movement about a camber axis to change camber. The actual camber axis of the suspension arm is so arranged as to reduce toe-out change in accordance with the rolling movement of the suspension arm to cause positive camber.

19 Claims, 7 Drawing Figures

TOE-OUT CHANGE PREVENTIVE SWING-ARM VEHICLE SUSPENSION

BACKGROUND OF THE INVENTION

The present invention relates generally to a swing-arm type vehicle suspension, such as a trailing arm or semi-trailing arm suspension, which can provide both good drivability and good cornering stability. More particularly, the invention relates to a swing-arm type suspension which prevents occurrence of toe-out change in compliance or roll steering, especially in roll steering which causes the camber to change in the positive direction.

It is well known that good drivability and higher cornering force can be obtained by providing weak understeer characteristics for a vehicle suspension. One of the essential features for providing understeer characteristics is to keep the toe angle in the toe-in direction when subjected to a cornering moment. Otherwise, toe-out change may provide an oversteer characteristic for the vehicle suspension which can adversely affect drivability and cornering stability. This toe-out change in the vehicle suspension may occur in compliance steering or roll steering as a result of changes of the suspension geometry and deformation of the suspension bushings.

In order to prevent the occurance of toe-out change in a vehicle suspension, European Published Application No. 0070025, filed by the assignee of the present application, discloses a swing-arm type suspension having a laterally extending assist link for resisting external lateral forces.

The present invention is generally directed to an improvement of the foregoing swing-arm type suspension described in Published European Application No. 0070025. More particularly, the invention concerns a swing-arm type suspension which eliminates the tendency for toe-out change to occur in roll steering which brings the vehicle suspension into positive camber. This camber change occurs as a suspension arm in the swing-arm suspension is rotated about an axis which is inclined with respect to the longitudinal axis of the vehicle, which rotational axis of the suspension arm will be referred to hereinafter as the "camber axis". In the swing-arm type suspension, especially in a trailing arm or semi-trailing arm suspension, the rotation of the suspension arm about the camber axis affects the toe angle and causes toe angle change due to lateral displacement of the suspension arm. If the axis of a wheel spindle mounted on the suspension arm is displaced upwardly and rearwardly by the rotation of the suspension arm about camber axis, toe-out change will occur. If the lateral displacement of the wheel spindle upon the occurrence of positive camber changes can be prevented, toe-out change can be prevented.

On the other hand, the toe angle does not change even though camber changes, when the camber axis lies parallel to the rolling direction of the road wheel. Therefore, to prevent the road wheel from changing toe angle, the camber axis should be as nearly parallel as possible to the rolling direction of the road wheel. In a trailing arm or semi-trailing arm suspension, the longitudinal central axis of the suspension arm is generally shifted or inclined outwardly toward the rear with respect to the transverse axis of the road wheel so that a relatively short spindle may be used to mount the road wheel. It is impractical to shift the rear end of the suspension arm inwardly so that the suspension arm has a camber axis substantially parallel to the rolling direction of the road wheel, since this would require a longer spindle which, to have enough strength, would undesirably increase the suspension arm weight. Therefore, it is impractical provide a suspension arm which is substantially parallel to the rolling direction of the road wheel.

Unless otherwise specified, references herein to the laterally outward and laterally inward directions are intended to refer to the directions away from, or toward, the longitudinal axis of the vehicle, respectively.

The term "rolling direction" of a road wheel is intended to refer to the direction established by a horizontal line through the center of the wheel perpendicular to the rotational axis of the wheel.

SUMMARY OF THE INVENTION

Accordingly it is the object of the present invention to provide and improved swing arm vehicle suspension for a wheeled vehicle.

Another object of the invention is to provide a swing arm vehicle suspension which facilitates improved drivability and good cornering stability for a vehicle equipped therewith.

It is also an object of the present invention to provide a swing arm vehicle suspension which exhibits less tendency for toe-out change to occur when the wheel camber changes in the positive direction.

These and other objects of the invention are achieved by providing a swing arm vehicle suspension for a wheeled vehicle comprising a suspension arm, wheel means for rotatably mounting a road wheel oriented in a desired rolling direction on one end of the suspension arm, pivot means for pivotably securing the other end of the suspension arm to a vehicle body, the pivot means permitting vertical pitching movement of the suspension arm about a pitching axis and resiliently permitting lateral yawing movement of the suspension arm and rotational movement of the suspension arm about a camber axis, the suspension arm having a theoretical camber axis extending along a line through said one end of the suspension arm and through the midpoint of the pivot means, the thoretical axis forming an angle with respect to the desired rolling direction of the road wheel, means interposed between the suspension arm and the vehicle body for retarding vertical pitching movement of the suspension arm, means connected to the suspension arm and the vehicle body for preventing lateral yawing movement of the suspension arm, and means for establishing an actual camber axis for the suspension arm which is more nearly parallel to the desired rolling direction of the road wheel than is the theoretical camber axis; whereby the tendency is reduced for toe-out change of the orientation of the road wheel to take place when rotational movement of the suspension arm and consequent camber change of the road wheel occur.

According to one preferred embodiment of the invention, the actual camber axis of the suspension arm is established by shifting the rolling center on the pitching axis outwardly from its theoretical location at the midpoint of the pivot means. To shift the rolling center outwardly, the rigidities of the bushing assemblies provided at the pivot end of the suspension arm are varied so that the outward bushing assembly is more rigid than the inward bushing assembly. By shifting the rolling center outwardly, the angle between the camber axis and the rolling direction of the road wheel becomes smaller, ie they become more nearly parallel.

According to another preferred embodiment of the invention, the actual camber axis is established by shifting the pivot point between the rear end of the suspension arm and the lateral yaw preventing means inwardly. For this purpose, a laterally inwardly extending bracket fixedly joined to the rear end of the suspension arm is provided to shift the pivot point.

In further prefered embodiments of the invention, the forward end of the suspension arm is bifurcated and is attached to the vehicle body by the pivot means, and the rearward end of the suspension arm is shifted laterally outwardly with respect to the forward end; the pitching movement retarding means comprises a shock absorber, and the yawing movement preventing means comprises a lateral member having one end pivotably attached to the rear end of the suspension arm and the other end secured to the vehicle body. Also, in a particularly preferred embodiment the pivot means comprises two resilient bushings which are co-axially aligned with the pivot axis of the pivot means; one of said bushings being disposed in a laterally outward position and the other of said bushings being disposed in a laterally inward position, and the outward bushing having a greater rigidity than the inward bushing. In yet another particularly prefered embodiment of the present invention, a laterally inwardly extending bracket is fixedly joined to the rear end of the suspension arm, and the yaw preventing means is pivotably joined to the inward end of the bracket.

BRIEF DESCRIPTION OF THE DRAWINGS

The invention will be described hereinafter in greater detail with reference to the accompanying drawings wherein.

DETAILED DESCRIPTION OF THE PREFERRED EMBODIMENTS

Figure 1:
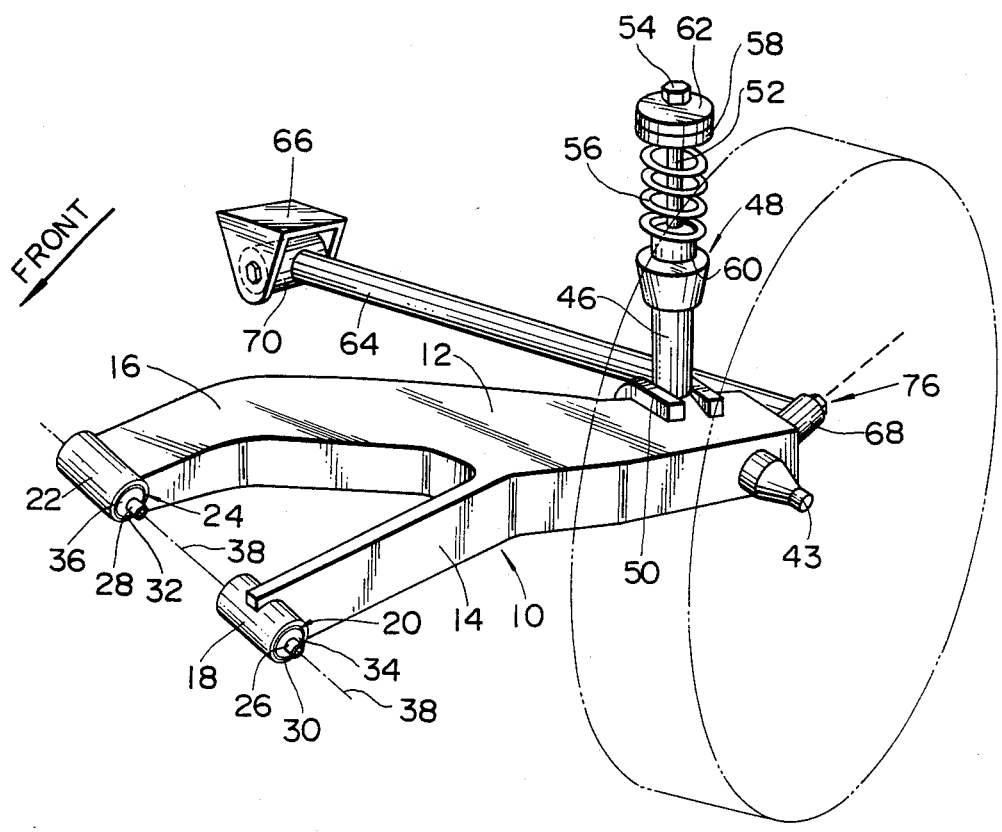
FIG. 1 is a perspective view of a semi-trailing arm suspension for a wheeled vehicle.

Referring now to the drawings, particularly to FIG. 1, there is illustrated the general construction of one preferred embodiment of a semi-trailing arm vehicle suspension according to the present invention. The semi-trailing arm vehicle suspension generally comprises a suspension arm 10 including an arm body 12 and bifurcated legs 14 and 16 extending from the front end of the arm body. Leg 14 has a cylindrical end section 18 at the front end thereof with a bushing assembly 20 received therein. Likewise, leg 16 has a cylindrical end section 22 at the front end thereof for receiving a bushing assembly 24. Bushing assemblies 20 and 24 generally comprise inner tubes 26 and 28, outer tubes 30 and 32, and elastic rubber bushings 34 and 36, respectively. The bushing assemblies 20 and 24 are disposed in the cylindrical end sections 18 and 22 coaxially to the latter. The axes of the bushings are in alignment and constitute a pivot axis 38 about which the suspension arm may rotate vertically.

The suspension arm 10 is rotatably mounted on a vehicle body cross member (not shown) with brackets via the bushing assemblies 20 and 24 so that it can move vertically about the pivot axis 38. The bushing assemblies 20 and 24 further allow lateral displacement and rotational movement of the suspension arm 10 by elastic deformation thereof.

The suspension arm 10 supports a wheel spindle 43 on the outer peripheral side of the arm body 12. A wheel hub and a road wheel 44 are mounted on wheel spindle 43 in substantially parallel relationship to the longitudinal vehicle axis. At the opposite side of the arm body, the suspension arm 10 is secured to the lower end of a suspension strut 46 of a shock absorber assembly 48 via a bracket 50. Suspension strut 46 encloses a shock absorber from which a thrusting piston rod 52 extends upwardly from the top of the suspension strut. The top end of the piston rod 52 is secured to a vehicle body (not shown) with a fastening nut 54. A suspension coil spring 56 is wound around the piston rod 52 with opposite ends of the spring seated on upper and lower spring seats 58 and 60, respectively. Upper spring seat 58 is secured to the piston rod 52 adjacent the top of the rod and engages a mounting insulator 62 inserted between the vehicle body and the upper spring seat. Lower spring seat 60 is secured to the suspension strut 46. The shock absorber assembly 48 thus provides a damping force to absorb vertical forces which cause relative vertical displacement between the vehicle body and the wheel axle.

Suspension arm 10 is further pivotably connected to the outer end of a lateral link or member 64 at the rear end of the arm body 12. The other end of the lateral member 64 is pivotably connected to the vehicle body via bracket 66. The lateral link 64 has substantially cylindrical end sections 68 and 70, respectively, oriented generally transverse to the axis of the lateral link. Each cylindrical end section 68 and 70 receives a bushing assembly (not shown) therein. This lateral link 64 provides resistance against lateral forces applied to the road wheel 44, which lateral forces otherwise cause yawing movement and toe-out change.

Figure 4A:
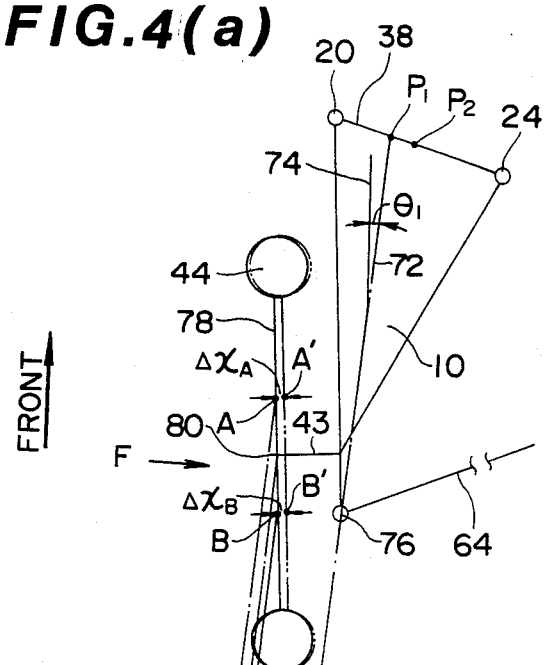
FIG. 4(a) is a schematic plan diagram illustrating the suspension geometry of the semi-trailing arm suspension of FIG. 1.
Figure 4B:
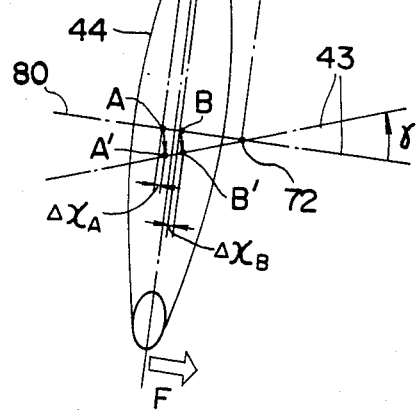
FIG. 4(b) is a schematic elevational diagram further illustrating the suspension geometry of the semi-trailing arm suspension of FIG. 1.

As can be best seen from FIGS. 4(a) and 4(b) the theoretical rolling center designated by point $P_2$ about which rotational rolling movement of the suspension arm 10 theoretically occurs to cause a camber change is located at the dimensional center of the pivot arm 10 between the bushing assemblies 20 and 24. The theoretical camber axis passes through the pitching axis midpoint $P_2$ of the pivot arm 10 and through the pivot point 76 between the suspension arm 10 and the lateral member or link 64. To place the road wheel at an appropriate position in the wheel well of the vehicle body and to provide sufficient strength for the spindle for mounting the road wheel, it is generally necessary to shift or incline the rear end of the suspension arm 10 outwardly so that it projects into the wheel well of the vehicle body. Accordingly, the pivot point 76 between the rear end of the suspension arm 10 and the lateral link 64 is shifted outwardly so that the lateral distance between pivot point 76 and the longitudinal axis of the vehicle body is greater than the lateral distance between the midpoint $P_2$ of the pivot means and the vehicle longitudinal axis. As a result, the theoretical camber axis is tilted or inclined outwardly toward the rear in relation to the rolling direction of the road wheel, which is substantially parallel to the longitudinal vehicle axis.

If the suspension arm is rotated about the theoretical camber axis, the rotation of the suspension arm 10 causes relative lateral displacement of the front and rear ends of the road wheel, which in turn produces a toe angle change. If the theoretical camber axis is tilted outwardly toward the rear, the toe angle change resulting from a camber change in a direction to cause positive camber will occur in the toe-out direction.

In the illustrated embodiment of the present invention, the angle of inclination of the actual camber axis with respect to the rolling direction of the wheel is reduced by providing different resilient characteristics or hardness for the bushing assemblies 20 and 24. By this means the angle of inclination the actual camber axis is reduced compared to the theoretical axis, without requiring any change in the suspension arm construction or use of a longer wheel spindle.

Figure 2:
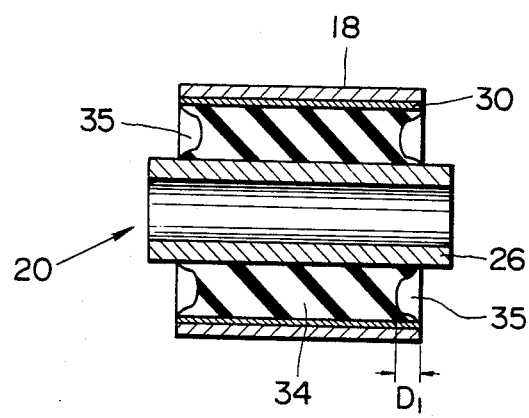
FIG. 2 is an enlarged sectional view of the outward bushing assembly of the semi-trailing arm suspension of FIG. 1.
Figure 3:
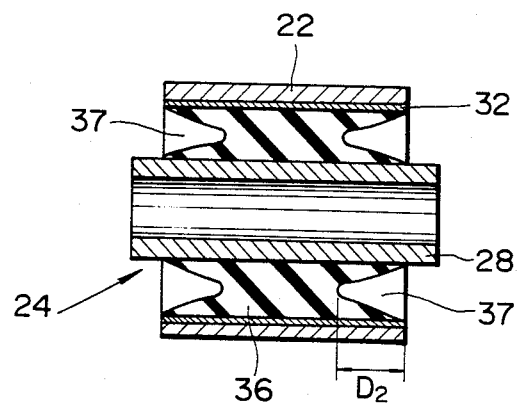
FIG. 3 is an enlarged sectional view of the inward bushing assembly of the semi-trailing arm suspension of FIG. 1.

FIGS. 2 and 3 show respectively the bushing assemblies 20 and 24. As previously mentioned, the bushing assembly 20 generally comprises inner and outer tubes 26 and 30 and annular rubber bushing 34. The rubber bushing 34 is formed with annular or circumferential grooves 35 in the axis ends thereof. Similarly, the bushing assembly 24 comprises inner and outer tubes 28 and 32 and annular rubber bushing 36 which is formed with annular or circumferential grooves 37 in each axial end thereof.

The depths of the grooves 35 and 37 differ from each other so that the depth $D_2$ of the grooves 37 in rubber bushing 36 is deeper than the depth $D_1$ of the grooves 35 in rubber bushing 34. As a result, the rigidity of rubber bushing 34 is higher than that of rubber bushing 36. Alternatively, the grooves 35 in bushing 34 may be omitted to further increase the rigidity thereof. The rigidity of outward bushing 34 may also be made higher than that of inward bushing 36 by forming it of resilient material having a lower modulus of elasticity.

As can be seen from FIGS. 4(a) and 4(b), this difference in bushing rigidity shifts the actual camber change center $P_1$ on the horizontal pivot axis 38 toward the bushing assembly 20 from the midpoint $P_2$ of the pivot axis 38. This will reduce the tilt angle $\theta_1$ of the actual camber axis 72 which entends through the camber center $P_1$ and through the pivot axis 76 between the suspension arm 10 and the lateral link 64, with respect to the rolling direction of the road wheel indicated by line 74. As a result of this reduction of the angle of inclination of the actual camber axis, the amount of toe angle change in the toe-out direction as the camber changes in the positive direction is geometrically reduced.

The geometric function of the semi-trailing arm suspension of the illustrated embodiment will now be described with reference to FIGS. 4(a) and 4(b) which illustrate the change in the suspension geometry in response to an external lateral force F which causes a positive camber change. As shown in FIG. 4(a), the actual camber axis 72 of the suspension arm 10 extends through the camber change center $P_1$ and the pivot axis 76. By shifting the camber change center $P_1$ from its theoretical location at $P_2$, the tilt angle $\theta_1$ of the actual camber axis 72 with respect to the rolling direction of the wheel is reduced to decrease the dimensional difference between the distance from the camber axis to point A on a horizontal wheel transverse axis 78 and the distance from the camber axis to point B on the horizontal wheel transverse axis. Points A and B are assumed to be located at the same distance from the rotational axis 80 of the road wheel.

The external lateral force F is assumed sufficient to rotate the suspension arm 10 in the counterclockwise direction in FIG. 4(b) to vertically tilt the rotational axis 80 through an angle $\gamma$. This suspension arm displacement changes the camber to a positive value. Due to the resulting shifting of the horizontal wheel transverse axis 78 inwardly, the points A and B are shifted respectively to A' and B', as shown in FIG. 4(a). Since the distances between the point A and the actual camber axis 72 and between the point B and the camber axis are approximately equal or not significantly different, the shifting distances $\Delta X_A$ and $\Delta X_B$ of the points A and B to A' and B' is not significantly different. Thus, the toe-out angle change is not so large as to adversely affect cornering stability or to cause significant power oversteering.

According to the embodiment set forth the above, the angle of inclination between the actual camber axis and the rolling direction of the wheel may be sufficiently small so as to keep the toe angle of the road wheel at almost neutral even when the suspension arm rotates about the camber axis. Importantly, this advantageous result is achieved without any dimensional change in the overall dimensions or relative positions of the respective suspension components of the semi-trailing arm suspension. Thus, according to the invention, higher cornering force in roll steering to cause positive camber can be obtained by merely varying the resiliency or deformation ratio of the suspension bushings.

Figure 5A:
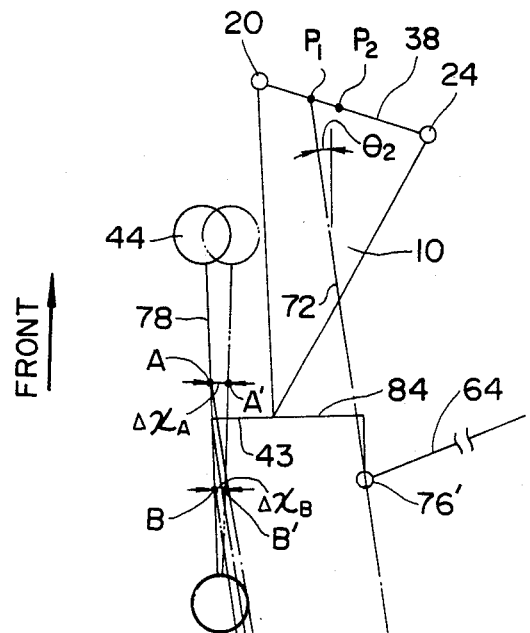
FIG. 5(a) is a schematic plan diagram illustrating the suspension geometry of an alternate embodiment of semi-trailing arm suspension according to the present invention.
Figure 5B:
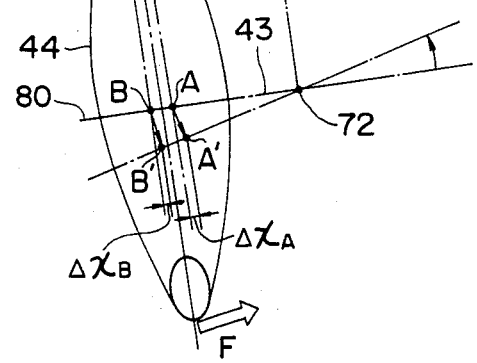
FIG. 5(b) is a schematic elevational diagram further illustrating the suspension geometry of the embodiment FIG. 5(a).

Another preferred embodiment of the present invention is illustrated in FIGS. 5(a) and 5(b). In this embodiment, an inward tilt angle $-\theta_2$ toward the rear of the vehicle is provided for the camber axis 72 of the suspension arm 10. This results in alteration of the dimensional relationship between the points A and B on the wheel transverse axis 78 with respect to the camber axis 72. Namely, the lateral distance between the point B and the camber axis 72 becomes larger than that between the point A and the camber axis. In this case, an increase in toe-in occurs in response to a camber change in the positive direction.

To obtain the negative tilt angle $-\theta_2$ in the camber axis 72, the vertical pivot axis 76 between the suspension arm 10 and the lateral link 64 is shifted inwardly. For this, a laterally inwardly extending bracket 84 having sufficient lateral length will be used to connect the suspension arm 10 and the lateral link or member 64 with the inwardly shifted pivot axis 76'. Bracket 84 is fixedly joined to the rear end of the suspension arm 10 and pivotably joined to lateral member 64.

Although the foregoing alternate preferred embodiment is shown with the outwardly shifted camber change center $P_1$ to cause the suspension geometry to have the camber axis tilted at a negative or inward angle, if desired the camber change center $P_1$ could be maintained at the dimensional center $P_2$ between the pivot bushings 20 and 24.

The foregoing description has been set forth merely to illustrate the invention and is not intended to be limiting. Since modifications of the disclosed embodiments incorporating the spirit and substance of the invention may occur to persons skilled in the art, the scope of the invention is to be limited solely with respect to the appended claims and equivalents.

What is claimed is:

1. A leading or trailing arm vehicle suspension for a wheeled vehicle comprising:
    a suspension arm having a pair of connecting portions;
    wheel means for rotatably mounting a road wheel oriented in a desired rolling direction on one end of said suspension arm;
    pivot means for pivotably securing the other end of said suspension arm to a vehicle body cross member through said connecting portions, one of said connecting portions being spaced inwardly relative to the other connecting portion, said pivot means permitting vertical pivoting movement of said suspension arm and wheel means about a pivot axis and resiliently permitting lateral yawing movement of said suspension arm and wheel means and rotational movement of said suspension arm and wheel means about a camber axis;
    said suspension arm having a theoretical camber axis extending along a line through said one end of said suspension arm and through a midpoint between said connecting portions of said pivot means, said theoretical axis forming an angle with respect to the desired rolling direction of said road wheel;
    a shock absorber means disposed between said suspension arm and said vehicle body for creating a shock absorbing force against relative movement in an essentially vertical direction between said suspension arm and said vehicle body;
    means for connecting said suspension arm to said vehicle body for preventing lateral yawing movement of said suspension arm and wheel means; and
    means associated with said suspension arm for establishing an actual camber axis for said suspension arm, said actual camber axis crossing said pivot axis of said pivot means at a position outwardly shifted from the midpoint between said connecting portions;
    whereby the tendency for toe-out change of the orientation of the road wheel to take place when rotational movement of the suspension arm and camber change of said road wheel occur is reduced.

2. A vehicle suspension as claimed in claim 1 wherein said one end of said suspension arm is located at a position shifted laterally outwardly with respect to said other end thereof so that said theoretical camber axis is angled with respect to the desired rolling direction of the road wheel.

3. A vehicle suspension as claimed in claim 1 wherein said other end of said suspension arm is bifurcated.

4. A vehicle suspension as claimed in claim 1 wherein said shock absorber means comprises a shock absorber assembly.

5. A vehicle suspension as claimed in claim 4 wherein said wheel means is located on the rearward end of said suspension arm with respect to said vehicle body.

6. A vehicle suspension as claimed in claim 1 wherein said yawing movement preventing means comprises a lateral member having a first end pivotably attached to said one end of said suspension arm and a second end secured to said vehicle body.

7. A vehicle suspension as claimed in claim 6 wherein said first end of said lateral member is attached directly to said one end of said suspension arm.

8. A vehicle suspension as claimed in claim 6 wherein said means for establishing an actual camber axis comprises means for disposing the point of pivotal attachment between said first end of said lateral member and said suspension arm laterally inwardly with respect to said one end of said suspension arm.

9. A vehicle suspension as claimed in claim 8 wherein said attachment point disposing means comprises a laterally inwardly extending bracket fixedly joined to said one end of said suspension arm and pivotably attached to said first end of said lateral member.

10. A vehicle suspension as claimed in claim 1 wherein said means for establishing an actual camber axis comprises a resilient bushing means associated with each said connecting portion, said connecting portions comprising an inner portion and an outer portion, the bushing means associated with said outer portion having a higher rigidity than the bushing means associated with said inner portion.

11. A vehicle suspension as claimed in claim 10 wherein said bushing means comprise a plurality of resilient bushings co-axially aligned with the pivot axis of said pivot means.

12. A vehicle suspension as claimed in claim 11 wherein said bushing means comprise two axially aligned bushings.

13. A vehicle suspension as claimed in claim 12 wherein said two bushings comprise an outward resilient bushing and an inward resilient bushing, said outward bushing having a lower modulus of elasticity than said inward bushing.

14. A vehicle suspension as claimed in claim 12 wherein said two bushings comprise an outward bushing and an inward bushing, and an annular groove is formed in each axial end of said inward bushing to reduce the rigidity thereof.

15. A vehicle suspension as claimed in claim 14 wherein an annular groove is formed in each end of both bushings; the grooves in the axial ends of said inward bushing being deeper than the grooves end the axial ends of said outward bushing.

16. A vehicle suspension as claimed in claim 11 wherein each bushing comprises and inner tubular member, an annular resilient member surrounding said tubular member and an outer cylindrical member around said resilient member.

17. A swing arm vehicle suspensions as defined in claim 1 further including a yaw preventing means comprising a lateral member having a first end, and having a second end secured to said vehicle body and wherein said mounting means includes an extension from said suspension arm, said extension being pivotally connected to said lateral member first end at a point disposed inwardly of said suspension arm first end relative to said vehicle body.

18. A swing arm vehicle suspension for a wheeled vehicle comprising:
    a suspension arm having a first end fixedly connected to a spindle for mounting a rolling wheel, and having a second end with a pair of mounting points;
    means for mounting said suspension arm to said vehicle body such that said second end is connected through said mounting points to said vehicle body and said suspension arm can pivot about a pivot axis passing through said points and such that said suspension arm is permitted to rotate about a camber axis substantially aligned with the longitudinal direction of said vehicle, said camber axis intersecting said pivot axis at a position between said pair of mounting points spaced from a midpoint between said pair of mounting points.

19. A swing arm as defined in claim 18 wherein said mounting means includes a pair of bushings, one of said bushings being disposed at each of said mounting points, and wherein one of said mounting points is disposed inwardly of the other mounting point relative to said vehicle, the bushing disposed at said outward mounting point having a lower modulus of elasticity than the bushing disposed at said inward mounting point.

* * * * *